United States Patent
Qian et al.

(10) Patent No.: US 12,451,244 B2
(45) Date of Patent: Oct. 21, 2025

(54) SYSTEM AND METHOD TO INTELLIGENTLY ADAPT THE ARRANGEMENT OF CONTENT DISPLAYS ACCORDING TO WORKFLOW CONTEXT

(71) Applicant: KONINKLIJKE PHILIPS N.V., Eindhoven (NL)

(72) Inventors: Yuechen Qian, Lexington, MA (US); Ranjith Naveen Tellis, Cambridge, MA (US); Olga Starobinets, Newton, MA (US); Hareesh Chamarthi, Cambridge, MA (US); Sandeep Madhukar Dalal, Winchester, MA (US); Vijay Parthasarathy, Lexington, MA (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 923 days.

(21) Appl. No.: 17/392,717

(22) Filed: Aug. 3, 2021

(65) Prior Publication Data
US 2022/0044803 A1    Feb. 10, 2022

Related U.S. Application Data

(60) Provisional application No. 63/061,822, filed on Aug. 6, 2020.

(51) Int. Cl.
*G06F 3/048*    (2013.01)
*G06F 9/451*    (2018.01)
(Continued)

(52) U.S. Cl.
CPC ............ *G16H 40/67* (2018.01); *G06F 9/451* (2018.02); *G16H 30/20* (2018.01); *G16H 40/20* (2018.01);
(Continued)

(58) Field of Classification Search
CPC ........ G16H 40/67; G16H 30/20; G16H 40/20; G16H 40/63; G16H 80/00; G06F 9/451;
(Continued)

(56) References Cited

U.S. PATENT DOCUMENTS 7,991,625 B2 *   8/2011   Rosenfeld ............ G08B 21/182
                                                600/300
8,195,481 B2 *   6/2012   Backhaus ............. G16H 40/20
                                                705/2
(Continued)

OTHER PUBLICATIONS

Robert D. Macdougell et al., "Development of a tool to aid the readiologic technologist using augmented reality and computer vision", Pediatr Radiol (2018) 48: 141-145.

*Primary Examiner* — Rashawn N Tillery

(57) ABSTRACT

A non-transitory computer readable medium (34) stores instructions executable by at least one electronic processor (32) to perform a method (100) for supporting remote experts (RE) in assisting local operators (LO) of respective medical imaging devices (2) during medical imaging examinations. The method includes: determining, in response to a calling local operator placing a call to a called remote expert, a context of the calling local operator based on at least one feed (15, 17, 17W, 18) of a workspace of the calling local operator; retrieving, from a database (34), a view configuration (36) for a determined user interface (UI) view based on the determined context; and controlling a display device (24) to display the determined UI view based on the retrieved view configuration.

22 Claims, 3 Drawing Sheets

(51) Int. Cl.

| | | |
|---|---|---|
| *G16H 30/20* | (2018.01) | |
| *G16H 40/20* | (2018.01) | |
| *G16H 40/63* | (2018.01) | |
| *G16H 40/67* | (2018.01) | |
| *G16H 80/00* | (2018.01) | |
| *H04N 21/2187* | (2011.01) | |
| *H04N 21/258* | (2011.01) | |

(52) U.S. Cl.
CPC ............ *G16H 40/63* (2018.01); *G16H 80/00* (2018.01); *H04N 21/2187* (2013.01); *H04N 21/25841* (2013.01)

(58) Field of Classification Search
CPC ............... G06F 9/452; H04N 21/2187; H04N 21/25841; H04N 7/15
See application file for complete search history.

(56) References Cited

U.S. PATENT DOCUMENTS

| | | | |
|---|---|---|---|
| 9,519,753 B1* | 12/2016 | Gerdeman | G16H 40/20 |
| 2004/0260790 A1* | 12/2004 | Balloni | A61B 5/7475 |
| | | | 709/219 |
| 2012/0010475 A1* | 1/2012 | Rossmeier | A61B 6/463 |
| | | | 600/301 |
| 2012/0133600 A1* | 5/2012 | Marshall | G16H 40/63 |
| | | | 345/173 |
| 2013/0035955 A1* | 2/2013 | Torres | G06Q 10/00 |
| | | | 713/300 |
| 2015/0077502 A1* | 3/2015 | Jordan | H04N 7/142 |
| | | | 348/14.03 |
| 2016/0062956 A1* | 3/2016 | Gotman | G16H 30/40 |
| | | | 715/243 |
| 2016/0119743 A1* | 4/2016 | Oh | H04L 41/0803 |
| | | | 455/41.2 |
| 2016/0124619 A1* | 5/2016 | McCallum | G06F 3/04845 |
| | | | 345/619 |
| 2016/0314278 A1 | 10/2016 | Mabotuwana | |
| 2016/0350503 A1* | 12/2016 | Jun | A61B 8/465 |
| 2018/0068078 A1* | 3/2018 | Barthell | G06N 20/00 |
| 2018/0075188 A1* | 3/2018 | Reicher | G16H 10/60 |
| 2018/0314891 A1* | 11/2018 | Ota | G16H 40/63 |
| 2019/0171467 A1* | 6/2019 | Hermosillo Valadez | G06T 7/0012 |
| 2020/0279640 A1* | 9/2020 | Amthor | A61B 5/0046 |
| 2021/0145280 A1* | 5/2021 | Starobinets | G06F 3/04847 |
| 2023/0316751 A1* | 10/2023 | Schmidt | A61B 5/742 |
| | | | 382/103 |
| 2023/0343449 A1* | 10/2023 | Amthor | G06T 11/60 |

* cited by examiner

SYSTEM AND METHOD TO INTELLIGENTLY ADAPT THE ARRANGEMENT OF CONTENT DISPLAYS ACCORDING TO WORKFLOW CONTEXT

This application claims the benefit of U.S. Provisional Application No. 63/061,822, filed on 6 Aug. 2020. This application is hereby incorporated by reference herein.

The following relates generally to the medical imaging arts, remote imaging assistance arts, remote medical imaging examination monitoring arts, and related arts.

BACKGROUND

Radiology Operations Command Center (ROCC) systems and methods provide remote technologist, remote expert, or "supertech" assistance to a local technician performing a medical imaging examination. The remote expert may be concurrently assigned to assist a number of different imaging bays at different sites that may be spread out across different cities or different states. To accommodate this, the remote workstation used by the supertech may provide standard views, such as: an enterprise view showing the geographic distribution of sites; a site view showing an overview of all scanners being assisted at a given site; and a room view showing an overview of the status of a single imaging bay.

These multiple views complicate the visual presentation, and have the potential to lead to mistakes, such as viewing the wrong imaging bay when assisting a local technician who contacts the super-tech for assistance. Even if mistakes such as this are not made, the need to navigate between the enterprise, site, and room views can impede efficiency of the super-tech.

The following discloses certain improvements to overcome these problems and others.

SUMMARY

In one aspect, a non-transitory computer readable medium stores instructions executable by at least one electronic processor to perform a method for supporting remote experts in assisting local operators of respective medical imaging devices during medical imaging examinations. The method includes: determining, in response to a calling local operator placing a call to a called remote expert, a context of the calling local operator based on at least one feed of a workspace of the calling local operator; retrieving, from a database, a view configuration for a determined user interface (UI) view based on the determined context; and controlling a display device to display the determined UI view based on the retrieved view configuration.

In another aspect, a system for supporting remote experts in assisting local operators of respective medical imaging devices during medical imaging examinations includes a feeds router configured to route audio/video feeds acquired by cameras and/or microphones disposed in workspaces of the respective local operators to workstations of respective remote experts and to route audio/video calls from local operators to the workstations of the respective remote experts. A non-transitory data storage stores view configurations for a plurality of UI views. At least one electronic processor is programmed to, in response to a calling local operator placing an audio/video call to a called remote expert via the feeds router: determine a context of the calling local operator based on at least the audio/video feeds acquired by the cameras and/or microphones disposed in the workspace of the calling local operator; based on the context, determine a UI view; retrieve the view configuration of the determined UI view from the non-transitory data storage; and cause the workstation of the called remote expert to display the determined UI view in accord with the retrieved view configuration.

In another aspect, a method for supporting remote experts in assisting local operators of respective medical imaging devices during medical imaging examinations includes: determining a context of the calling local operator based on at least one feed of a workspace of the calling local operator; based on the context, determining a UI view; retrieving the view configuration of the determined UI view for the called remote expert from a non-transitory data storage; and causing a workstation of the called remote expert to display the determined UI view in accord with the retrieved view configuration.

One advantage resides in providing a remote expert or radiologist assisting a technician in conducting a medical imaging examination with positional awareness of local imaging examination(s) which facilitates providing effective assistance to one or more local operators at different facilities.

Another advantage resides in automatically providing a situation-appropriate view on a computer of a remote expert of a local operator needing assistance.

Another advantage resides in a simple visual presentation on a computer of a remote expert to assist multiple local operators, resulting in fewer remote expert mistakes.

Another advantage resides in improving efficiency of assistance from a remote expert to one or more local operators.

Another advantage resides in providing customized screen layouts on a computer for a remote expert to assist one or more local operators.

A given embodiment may provide none, one, two, more, or all of the foregoing advantages, and/or may provide other advantages as will become apparent to one of ordinary skill in the art upon reading and understanding the present disclosure.

BRIEF DESCRIPTION OF THE DRAWINGS

The disclosure may take form in various components and arrangements of components, and in various steps and arrangements of steps. The drawings are only for purposes of illustrating the preferred embodiments and are not to be construed as limiting the disclosure.

DETAILED DESCRIPTION

A context-sensitive display system for ROCC systems is disclosed. A database stores configuration data for displaying the various views. This configuration data may optionally be specific for each super-tech, and/or specific to each site, either by providing a views configuration graphical user interface (GUI) dialog via which the super-tech enters a personal configuration, and/or by storing the last known configuration per site for that super-tech.

The ROCC system also has a database of addressing information for each imaging bay, such as data structures associating each imaging bay with its corresponding site, and associated IP addresses/phone numbers/or other addressing data for each imaging bay. The ROCC also provides one or more video feeds for each imaging bay and possibly additional video feeds for the waiting area of each site, and these video feeds are associated to individual imaging bays or sites using the aforementioned data structures based on webcam IP addresses or the like.

The context-sensitive display system also includes an electronic processor programmed to perform event detection, which detects events such as a call for assistance received from a local technician. Event information (i.e. context for the event) is collected, such as the site and the imaging bay based on the address of the call, location of the local technician calling for assistance as determined from analysis of the video feeds, or so forth. Other context information is gathered such as the imaging workflow stage (if available from the ROCC), and based on this information the display system is set to the appropriate view(s) in accord with the context of the call and the super-tech and site specific views configuration.

Furthermore, the electronic processor of the context-sensitive display system is programmed to track and update the context during a call, so that if for instance the local technician moves from the waiting room into the imaging bay this is detected by analysis of the waiting room and bay video feeds and the context-sensitive display is updated accordingly, e.g. by switching from showing the waiting room video feed to showing the imaging bay video feed.

If the super-tech receives multiple calls from different local technicians that are placed into a queue for resolution, then the event context for each queued call is stored and updated in real time, and as the super-tech resolves each call in turn the appropriate views for the next call in the queue are automatically set up and shown on the super-tech's workstation. Optionally, the electronic processor may rank the queued calls using a context-based prioritization (where call timestamp may also be a factor, i.e. biasing toward higher priority for earlier-received calls), and the calls are then queued in the context-based prioritization order.

Figure 1:
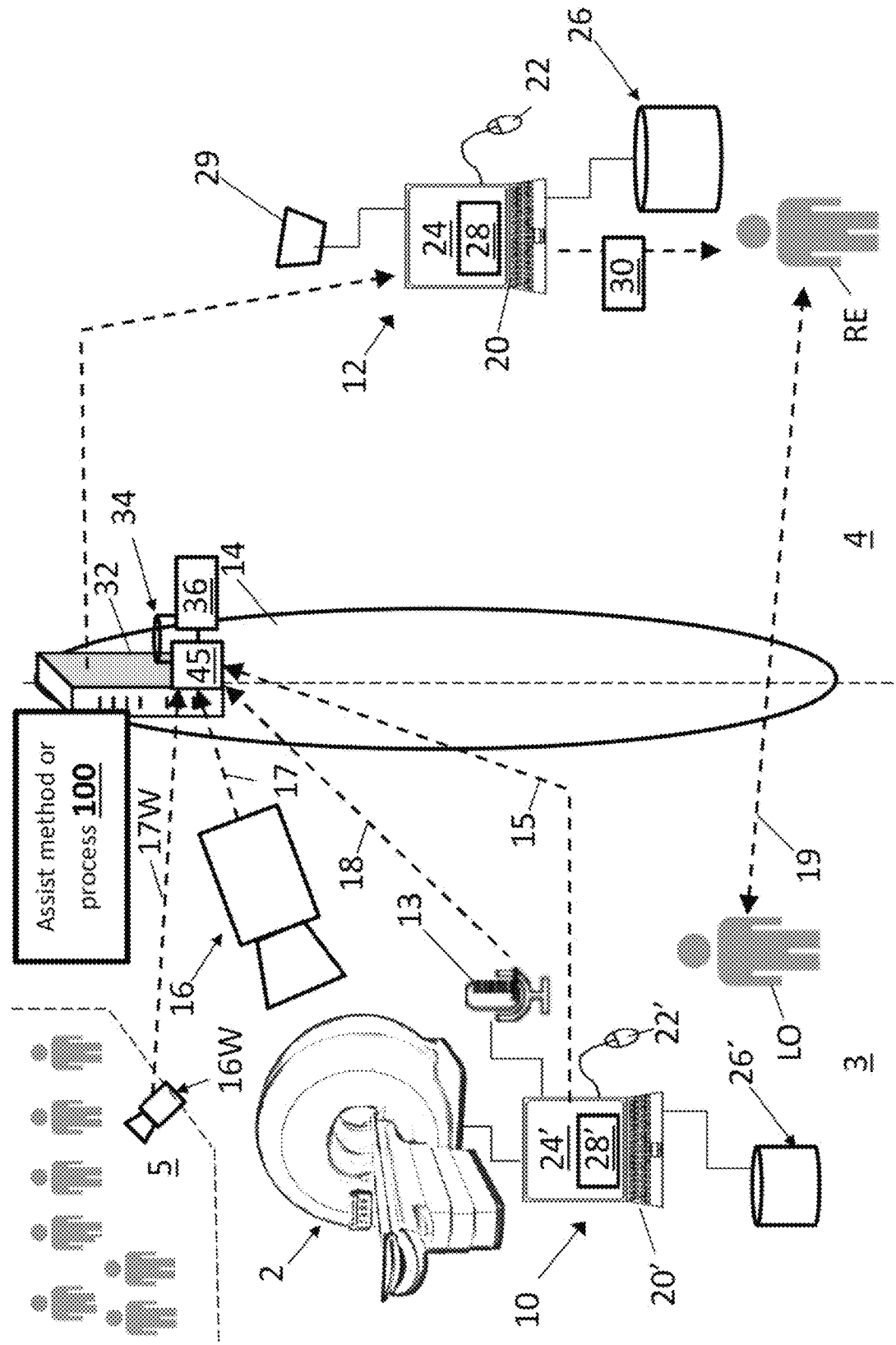
FIG. 1 diagrammatically shows an illustrative apparatus for providing remote assistance in accordance with the present disclosure.

With reference to FIG. 1, an apparatus 1 for providing assistance from a remote medical imaging expert RE (or supertech) to a local technician operator LO is shown. As shown in FIG. 1, the local operator LO, who operates a medical imaging device (also referred to as an image acquisition device, imaging device, and so forth) 2, is located in a medical imaging device bay 3, and the remote expert RE is disposed in a remote service location or center 4. The workspace of the imaging technicians may include other associated areas, such as a waiting room 5 at each site (e.g., each radiology laboratory) where patients who have arrived for an imaging examination wait to be led into an imaging bay for the examination. It should be noted that the "remote expert" RE may not necessarily directly operate the medical imaging device 2, but rather provides assistance to the local operator LO in the form of advice, guidance, instructions, or the like. The remote location 4 can be a remote service center, a radiologist's office, a radiology department, and so forth. The remote location 4 may be in the same building as the medical imaging device bay 3 (this may, for example, in the case of a "remote operator or expert" RE who is a radiologist tasked with peri-examination image review), but more typically the remote service center 4 and the medical imaging device bay 3 are in different buildings, and indeed may be located in different cities, different countries, and/or different continents. In general, the remote location 4 is remote from the imaging device bay 3 in the sense that the remote expert RE cannot directly visually observe the imaging device 2 in the imaging device bay 3 (hence optionally providing a video feed as described further herein).

The image acquisition device 2 can be a Magnetic Resonance (MR) image acquisition device, a Computed Tomography (CT) image acquisition device; a positron emission tomography (PET) image acquisition device; a single photon emission computed tomography (SPECT) image acquisition device; an X-ray image acquisition device; an ultrasound (US) image acquisition device; or a medical imaging device of another modality. The imaging device 2 may also be a hybrid imaging device such as a PET/CT or SPECT/CT imaging system. While a single image acquisition device 2 is shown by way of illustration in FIG. 1, more typically a medical imaging laboratory will have multiple image acquisition devices, which may be of the same and/or different imaging modalities. For example, if a hospital performs many CT imaging examinations and relatively fewer MRI examinations and still fewer PET examinations, then the hospital's imaging laboratory (sometimes called the "radiology lab" or some other similar nomenclature) may have three CT scanners, two MRI scanners, and only a single PET scanner. This is merely an example. Moreover, the remote service center 4 may provide service to multiple hospitals. The local operator controls the medical imaging device 2 via an imaging device controller 10. The remote operator is stationed at a remote workstation 12 (or, more generally, an electronic controller 12).

As used herein, the term "medical imaging device bay" (and variants thereof) refer to a room containing the medical imaging device 2 and also any adjacent control room containing the medical imaging device controller 10 for controlling the medical imaging device. For example, in reference to an MRI device, the medical imaging device bay 3 can include the radiofrequency (RF) shielded room containing the MRI device 2, as well as an adjacent control room housing the medical imaging device controller 10, as understood in the art of MRI devices and procedures. On the other hand, for some other imaging modalities, the imaging device controller 10 may be located in the same room as the imaging device 2, so that there is no adjacent control room and the medical bay 3 is only the room containing the medical imaging device 2. In addition, while FIG. 1 shows a single medical imaging device bay 3, it will be appreciated that the remote service center 4 (and more particularly the remote workstation 12) is in communication with multiple medical bays via a communication link 14, which typically comprises the Internet augmented by local area networks at the remote expert RE and local operator LO ends for electronic data communications. In addition, while FIG. 1 shows a single remote service center 4, it will be appreciated that the medical imaging device bays 3 is in communication with multiple medical bays via the communication link 14. Furthermore, there may also be additional locations which are not part of any particular medical imaging device bay, but which may be part of a site hosting a number of imaging bays and may be part of the workspace of an imaging technician insofar as the imaging technician may temporarily occupy such a location as part of an imaging examination task. An example of such a location may be, for example, the hospital radiology lab waiting room 5 where patients who have arrived for imaging examinations wait prior to being directed or taken into a specific imaging bay.

As diagrammatically shown in FIG. 1, in some embodiments, a camera 16 (e.g., a video camera) is arranged to acquire a video stream or feed 17 of a portion of a workspace of the medical imaging device bay 3 that includes at least the area of the imaging device 2 where the local operator LO interacts with the patient, and optionally may further include the imaging device controller 10. In other embodiments, a microphone 13 is arranged to acquire an audio stream or feed 18 of the workspace that includes audio noises occurring within the medical imaging device bay 3 (e.g., verbal instructions by the local operator LO, questions from the patient, and so forth). The video stream 17 and/or the audio stream 18 is sent to the remote workstation 12 via the communication link 14, e.g. as a streaming video feed received via a secure Internet link.

A further source of data is the imaging device controller 10. In a suitable embodiment, a live video feed 15 of the controller display is provided by a DVI splitter, a HDMI splitter, and so forth; or a connection to an auxiliary video output port of the controller 10 (if available); or provided by screen sharing software running on the imaging device controller 10 itself. The illustrative embodiment further includes an additional camera 16W deployed in the waiting room 5 to acquire a video feed 17W of the waiting room 5. Typically, the various data streams 15, 17, 17W, 18 collected from the medical imaging device bay 3 or other workspace portions (e.g., the waiting room 5) each have a unique identifier, such as a unique Internet Protocol (IP) address.

The communication link 14 also provides a natural language communication pathway 19 for verbal and/or textual communication between the local operator and the remote operator. For example, the natural language communication link 19 may be a Voice-Over-Internet-Protocol (VOIP) telephonic connection, an online video chat link, a computerized instant messaging service, or so forth. Alternatively, the natural language communication pathway 19 may be provided by a dedicated communication link that is separate from the communication link 14 providing the data communications 17, 18, e.g. the natural language communication pathway 19 may be provided via a landline telephone. In some embodiments, the natural language communication link 19 allows a local operator LO to call a selected remote expert RE. The call, as used herein, can refer to an audio call (e.g., a telephone call), a video call (e.g., a Skype or FaceTime or other screen-sharing program), or an audio-video call.

FIG. 1 also shows, in the remote service center 4 including the remote workstation 12, such as an electronic processing device, a workstation computer, or more generally a computer, which is operatively connected to receive and present the video feed 17 of the medical imaging device bay 3 from the camera 16 and/or to the audio feed 18. Additionally or alternatively, the remote workstation 12 can be embodied as a server computer or a plurality of server computers, e.g. interconnected to form a server cluster, cloud computing resource, or so forth. The workstation 12 includes typical components, such as an electronic processor 20 (e.g., a microprocessor), at least one user input device (e.g., a mouse, a keyboard, a trackball, and/or the like) 22, and at least one display device 24 (e.g. an LCD display, plasma display, cathode ray tube display, and/or so forth). In some embodiments, the display device 24 can be a separate component from the workstation 12. The display device 24 may also comprise two or more display devices. The electronic processor 20 is operatively connected with a one or more non-transitory storage media 26. The non-transitory storage media 26 may, by way of non-limiting illustrative example, include one or more of a magnetic disk, RAID, or other magnetic storage medium; a solid state drive, flash drive, electronically erasable read-only memory (EEROM) or other electronic memory; an optical disk or other optical storage; various combinations thereof; or so forth; and may be for example a network storage, an internal hard drive of the workstation 12, various combinations thereof, or so forth. It is to be understood that any reference to a non-transitory medium or media 26 herein is to be broadly construed as encompassing a single medium or multiple media of the same or different types. Likewise, the electronic processor 20 may be embodied as a single electronic processor or as two or more electronic processors. The non-transitory storage media 26 stores instructions executable by the at least one electronic processor 20. The instructions include instructions to generate a graphical user interface (GUI) 28 for display on the remote operator display device 24.

The medical imaging device controller 10 in the medical imaging device bay 3 also includes similar components as the remote workstation 12 disposed in the remote service center 4. Except as otherwise indicated herein, features of the medical imaging device controller 10, which includes a local workstation 12', disposed in the medical imaging device bay 3 similar to those of the remote workstation 12 disposed in the remote service center 4 have a common reference number followed by a "prime" symbol, and the description of the components of the medical imaging device controller 10 will not be repeated. In particular, the medical imaging device controller 10 is configured to display a GUI 28' on a display device or controller display 24' that presents information pertaining to the control of the medical imaging device 2, such as configuration displays for adjusting configuration settings an alert 30 perceptible at the remote location when the status information on the medical imaging examination satisfies an alert criterion of the imaging device 2, imaging acquisition monitoring information, presentation of acquired medical images, and so forth. It will be appreciated that the screen mirroring (i.e. screen sharing; or alternatively screen capture) data stream 15 carries the content presented on the display device 24' of the medical imaging device controller 10. The communication link 14 allows for screen sharing between the display device 24 in the remote service center 4 and the display device 24' in the medical imaging device bay 3. The GUI 28' includes one or more dialog screens, including, for example, an examination/scan selection dialog screen, a scan settings dialog screen, an acquisition monitoring dialog screen, among others.

FIG. 1 shows an illustrative local operator LO, and an illustrative remote expert RE (i.e. expert, e.g. supertech).

Figure 2:
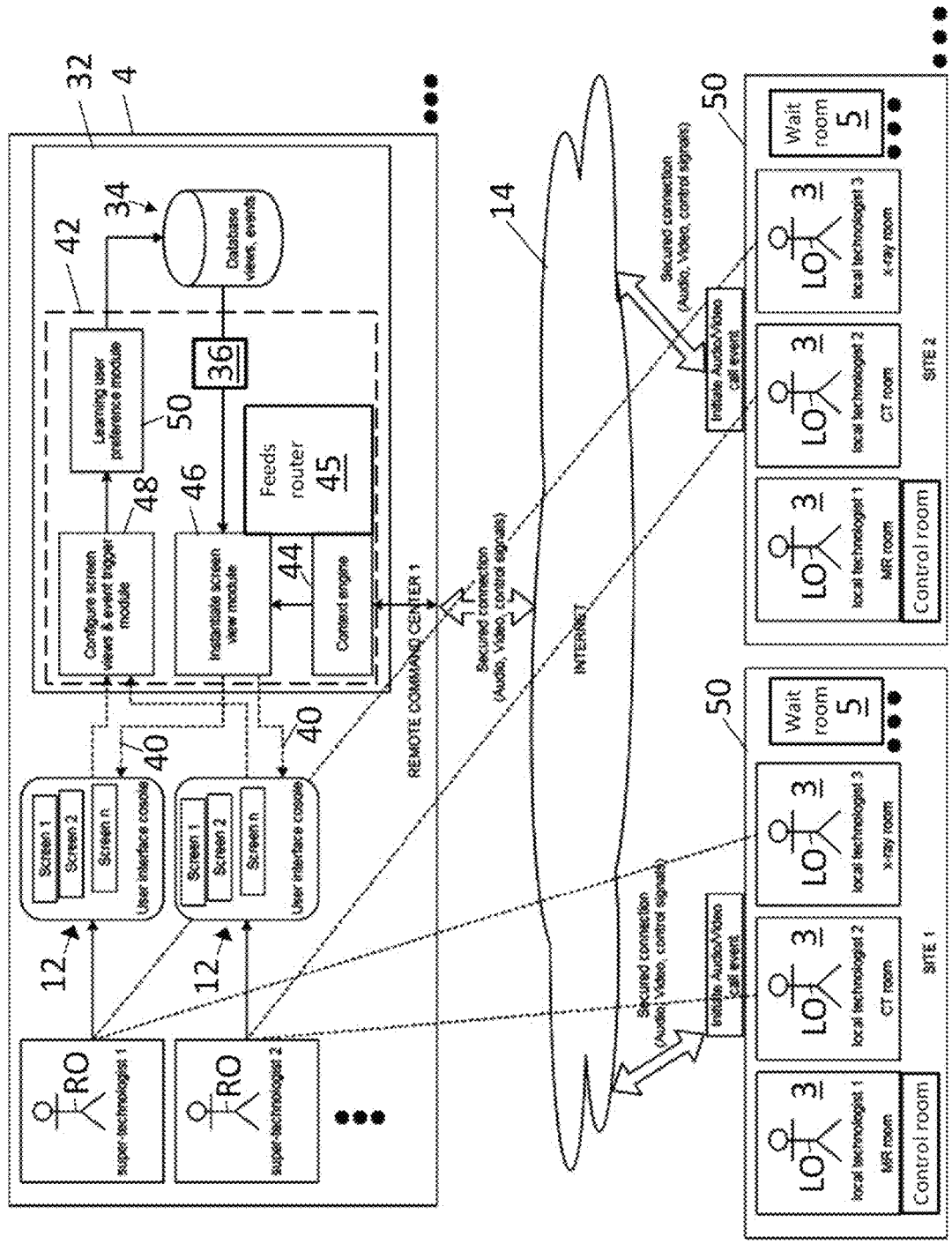
FIG. 2 diagrammatically shows a further example of an apparatus for providing remote assistance in accordance with the present disclosure.

With reference to FIG. 2, however, the remote location 4 is a Radiology Operations Command Center (ROCC) 4. The ROCC 4 provides a staff of supertechs RE with respective remote workstations 12 who are available to assist local operators LO at different sites 50 such as different hospitals, radiology labs, or the like. As shown in FIG. 2, each site 50 typically houses multiple imaging bays 3 staffed by respective local operators LO (although a site having a single imaging bay is also contemplated). Each site may also include common workspace that is shared by (that is, may be occupied by any of) the local operators at that site, such as the illustrative waiting room 5 of each site 50 diagrammatically indicated in FIG. 2. The communication link 14 is shown in FIG. 2 as the Internet; additionally, the communication link from any given site 50 to the ROCC 4 may include a local area network (LAN), not shown, such as a hospital network that connects with the Internet; likewise, the communication link 14 may include a LAN at the ROCC 4 which is not shown in FIG. 2. FIG. 2 also shows a server (or, more generally, an electronic processor) 32 (also indicated in FIG. 1) as part of the ROCC 4. However, it should be noted that the server 32 may in some embodiments be physically located at a different location than the location of the supertechs RE and their respective remote workstations 12. For example, the server 32 may be physically embodied as a cloud-based computing resource connected with the various remote workstations 12 via the Internet. Indeed, it is contemplated that the various remote experts RE may be located at different locations; that is, the ROCC 4 itself may be a "virtual" remote operating command center in which the various remote expert workstations 12 are geographically separated and connected as a "center" by way of common operational connection with the server(s) 32. The ROCC thus may be housed in a single physical location or may be geographically distributed. For example, in one contemplated implementation, the remote expert RE are recruited from across the United States and/or internationally in order to provide a staff of supertechs with a wide range of expertise in various imaging modalities and in various imaging procedures targeting various imaged anatomies.

In view of this multiplicity of local operators LO and multiplicity of remote expert RE, the disclosed communication link 14 includes the server computer 32 (which again may be a cluster of servers, cloud computing resource comprising servers, or so forth) which is programmed to establish connections between selected local operator LO/remote expert RE pairs. For example, if the server computer 32 is Internet-based, then connecting a specific selected local operator LO/remote expert RE connection can be done using Internet Protocol (IP) addresses of the various components 16, 10, 12, the telephonic or video terminals of the natural language communication pathway 19, et cetera. The server computer 32 is operatively connected with a one or more non-transitory storage media or data storage 34. The non-transitory storage media 34 may, by way of non-limiting illustrative example, include one or more of a magnetic disk, RAID, or other magnetic storage medium; a solid state drive, flash drive, electronically erasable read-only memory (EEROM) or other electronic memory; an optical disk or other optical storage; various combinations thereof; or so forth; and may be for example a network storage, an internal hard drive of the server computer 32, various combinations thereof, or so forth. It is to be understood that any reference to a non-transitory medium or media 34 herein is to be broadly construed as encompassing a single medium or multiple media of the same or different types. Likewise, the server computer 32 may be embodied as a single electronic processor or as two or more electronic processors. The non-transitory storage media 34 stores instructions executable by the server computer 32. In addition, the non-transitory computer readable medium 34 (or another database) stores data related to a set of remote experts RE and/or a set of local operators LO. The remote expert data can include, for example, skill set data, work experience data, data related to ability to work on multi-vendor modalities, data related to experience with the local operator LO and so forth.

The non-transitory storage media 34 of the server computer 32 is configured to store a plurality of view configurations 36 for a plurality of views displayed via the GUI 28 on the display device 24 of the remote workstations 12 operable by individual remote experts RE. In some examples, the view configurations 36 can be individual view configurations for individual remote experts RE. When the local operator LO calls a select remote expert RE, then the corresponding view configuration(s) 32 for the called remote expert can be retrieved from the non-transitory computer readable medium 34 of the server computer 32 and displayed on the remote workstation 12 of the remote expert RE who was called. The view configurations 36 can be created by the respective remote experts RE, or by an automated process (e.g., saving a last known configuration per site for that remote expert/local technologist RE/LO combination.

The view configurations 36 correspond to UI views displayed via the GUI 28 on the display device 24 of the remote workstation 12. The UI views can include, for example, at least one workspace view which displays and/or outputs, via a loudspeaker 29 of the remote workstation 12, the captured or shared controller display live video feed 15, at least one audio feed 18 and/or video feed 17 or waiting room video feed 17W; a site view which displays status information on a plurality of local operators (LO) at a common site (e.g., a common medical imaging bay 3), an enterprise view which displays a map of geographic distribution of a plurality of sites, and so forth. In general, as indicated in FIG. 1, the electronic processor 32 instantiates a remote expert UI 40 by populating a view configuration chosen from the view configurations 36 with one or more of the data feeds 15, 17, 17W, 18 appropriate for assisting a particular local operator LO currently being assisted.

With particular reference to FIG. 2, the electronic processor 32 is programmed to instantiate the remote expert UI 40 individualized for each remote expert RE and presented on their respective workstations 12 as follows. A context engine 44 processes the feeds (e.g. feeds 15, 17, 17W, 18) from devices monitoring the imaging bay (and any ancillary workspace such as a waiting room 5) of a local operator LO calling a remote expert RE to determine a context of the calling local operator LO based the on the feed(s) 15, 17, 17W, 18 of the workspace 3, 5 of the calling local operator. The context engine 44 consumes the feeds 15, 17, 17W, 18 associated to the calling local operator LO by the feeds router 45. The association of feeds to specific local operators may be done, for example, using a lookup table or other data structure associating IP addresses (or other address designations) of the feeds with corresponding local operators. A screen view instantiation module 46 then retrieves, from the database 34, a view configuration 36 for the remote expert UI view 40 based on the determined context, and instantiates the remote expert UI 40 by populating the view configuration 36 with appropriate feed(s) obtained again from the feeds router 45. As further indicated in FIG. 2, in some embodiments the view configurations 36 stored in the database 34 may be individually configured for specific remote experts. For example, this configuration may be explicitly performed by the remote expert RE. To this end, a view configurations editor 48 may be provided on the remote workstation 12 used by the remote expert RE, for example brought up by the user selecting at tab, icon, or other user dialog shown on the UI 28 for this purpose). Via the view configurations editor 48, the remote expert RE can configure remote expert-specific view configurations. Additionally or alternatively, a machine learning component 50 can learn remote expert-specific view configurations based on monitoring the user-configurable changes to default view configurations made by specific remote experts.

With continuing reference to FIGS. 1 and 2, in one embodiment of the assisting method or process 100, the server computer 32 is programmed with several components or instructions 42, 44, 45, 46, 48 to provide assistance from the remote expert RE to the local operator LO. In some embodiments, the server computer 32 is programmed to receive audio or video calls from the local operator LO via, for example, the natural language communication pathway 19 natural language communication pathway 19, settings associated with the medical imaging device 2 and the medical imaging device controller 10 (e.g., beginning of exam, end of exam, change of protocol, system alerts, and so forth). In other embodiments, the server computer 32 (e.g., context engine 44) is programmed to extract a context of the call related to a triggering event in the medical device imaging bay 3 which required the assistance from the remote expert RE. In further embodiments, the server computer 32 is configured to retrieve a corresponding view configuration 36 from the non-transitory computer readable medium 34, and display a view associated with the retrieved view configuration 36 on the remote workstation 12 operable by the remote expert RE who received the call from the local operator LO. The retrieved view configuration 36 is suitably populated by one or more feeds relevant to the calling local operator LO obtained from the feed router 45. For example, the view configuration 36 may include windows for displaying a controller screen sharing feed and the video feed from the video camera located in the imaging bay; then, to instantiate the remote expert UI view 40 these windows are populated with the controller screen sharing feed 15 and the video camera feed 17, respectively, associated to the calling local operator LO. The remote expert-specific configurations (e.g., explicitly defined via the view configurations editor 48, and/or defined by the machine learning 50 operating on historical remote expert-specific view configuration modifications) might, for example, include resizing and/or repositioning one or both of these windows. The populating of the view configuration 36 might also include populating non-feed fields of the view configuration 36. For example, the view configuration 36 may include a field for textually displaying the imaging workflow stage, which may be part of the context determined for example by the context engine 44 based on analysis of the various feeds associated to the calling local operator.

Figure 3:
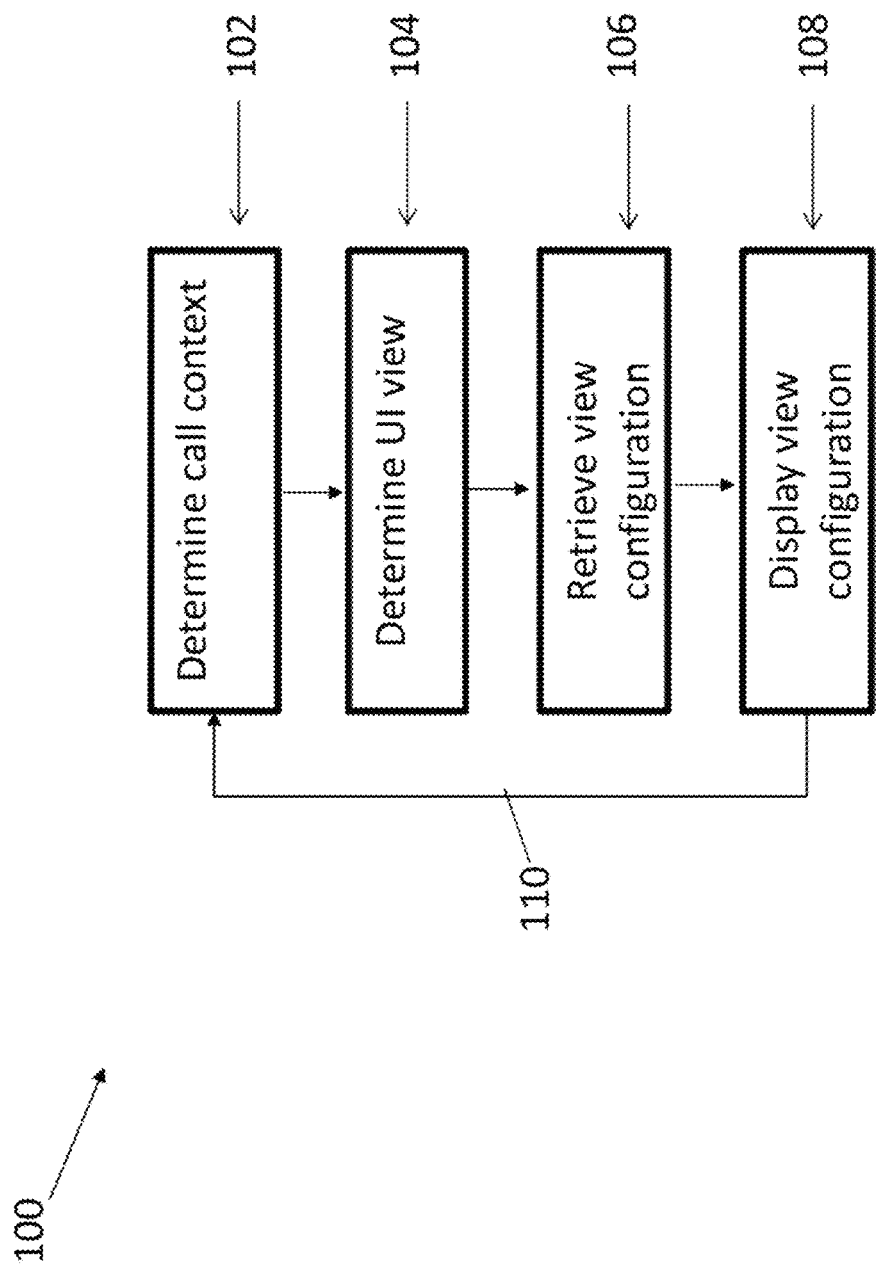
FIG. 3 shows an example flow chart of operations suitably performed by the apparatus of FIG. 1.

With reference to FIG. 3, and with continuing reference to FIGS. 1 and 2, an illustrative embodiment of method 100 for assisting local operators LO of respective medical imaging devices 2 during medical imaging examinations performed by the server computer 32 is diagrammatically shown as a flowchart. To begin the method 100, an imaging examination is commenced by the local operator LO using the medical imaging device 2. An event can occur during the examination which requires assistance from a remote expert RE; or, alternatively, the local operator LO may proactively call for assistance via the natural language communication pathway 19.

At an operation 102, once the call is received at the ROCC center, a context of the calling local operator LO is determined by the context engine 44 based on at least the audio feed 18 and/or the video feed(s) 17, 17W, and/or the controller screen sharing feed 15. At an operation 104, a UI view is determined based on the context. At an operation 106, a view configuration 36 of the determined UI view is retrieved from the non-transitory computer readable medium 34 and populated by the appropriate feed(s) associated to the local operator LO to be assisted to generate the remote operator UI view 40. The operations 104, 106 are suitably performed by the screen view instantiation module 46 of FIG. 2. At an operation 108, the workstation 12 of the remote expert RE who received the call is controlled or caused to present the determined UI view 40 on the display device 24 (where the presenting may in general include displaying images and/or video content, and/or presenting audio content via the loudspeaker 29 indicated in FIG. 2) in accord with the retrieved view configuration 36. Once the UI view is displayed, the remote expert RE can then provide assistance to the calling local operator LO.

Furthermore, as diagrammatically indicated by process flow arrow 110 returning to the context determination step 102, the system continually monitors the context and updates the UI view determination 104 and view configuration selection 106 based on potentially change context during the assistance. For example, the local operator LO may initiate the call in the waiting room 5 due to encountering a patient with an unusual mobility problem. Hence, the initial pass of the context determination operation 102 determine that the context includes the local operator LO being in the waiting room 5, and the initial pass of the operation 104 determines the UI view should be one that shows the video feed 17W of the waiting room 5, and the initial pass of the operation 106 retrieves a view configuration 36 that includes a window presenting the waiting room video feed 17W. The remote expert RE then provides verbal assistance to the local operator LO to direct how to effectively move the mobility-limited patient into the imaging bay 4 where the imaging examination will be conducted. As the local operator LO enters the imaging bay 4, a subsequent pass of the context determination operation 102 detects this change in context to the imaging bay 4, and the consequent pass of the operation 104 determines the UI view should be one that now shows the video feed 17 of the imaging bay 4, and the consequent pass of the operation 106 retrieves a view configuration 36 that includes a window presenting the imaging bay video feed 17.

In some embodiments, the context determination operation 102 includes determining of the context of the call to determine a current location of the calling local operator. The UI view determination operation 104 then includes determining the UI view based on the current location of the calling local operator LO. In some examples, the determining of the UI view includes determining a UI view which presents the feed 17 acquired by the camera 16. In this example, the location of the calling local operator LO is continuously tracked in the feed 17 (or additionally the audio feed 18) as indicated by process flow arrow 110. The operation 104 then includes determining the UI view over the duration of the call to continuously update the UI view based on the continuously tracked location of the calling local operator LO. Then, the displaying operation 108 includes displaying the determined UI view being continuously updated in accord with the continuously tracked location of the calling operator LO on the workstation 12 of the called remote expert RE.

In other embodiments disclosed herein, the retrieving operation 106 includes retrieving the view configuration 36 of the determined UI view for the called remote expert RE from the non-transitory computer readable medium 34. In this embodiment, the remote workstation(s) 12 can provide a view configurations editor on the GUI 28 to allow the remote expert(s) RE to configure respective remote expert-specific view configurations 36, which are then stored in (and subsequently retrieved from), the non-transitory data storage 36.

EXAMPLES

The following describes examples of the method 100. In a first example, when the remote expert RE receives and accepts a call from a local operator LO who is scanning a patient on, for example, a MRI scanner 2, the server computer 32 automatically switches to a preset of the displaying regions as follows: the room view and the table view, the scanner room, and the console(s) of the scanner are shown on selected remote workstations 12. A name of the patient can be visually highlighted so that the remote expert RE knows the patient context is changed. A video call window is displayed on the remote workstation 12, which is scaled twice bigger as the local operator LO is using the camera 16 to capture the patient position information and sharing it with the remote experts RE.

In another example, when the remote expert RE receives and accepts a call from a local operator LO standing next to the imaging device 2, the server computer 32 automatically switches to a preset of the displaying regions as follows: the room view of the imaging device that is being used by the local operator, and the table view of the imaging device showing the position of the patient.

In another example, when the remote expert RE receives and accepts a call from a local operator LO standing in a waiting area, the server computer 32 automatically switches a preset of the displaying regions as follows: an enterprise and site view that is being managed by the local operator is displayed, a worklist of exams that are being handled by the local operator is displayed; and a room view of the imaging device 2, with which the local operator is about to use.

In another example, when multiple views need to be displayed on a single display, a side-by-side or grid configuration can be used to accommodate views.

On the completion of the call, the server computer 32 automatically restores the remote workstation 12 before the call.

The disclosure has been described with reference to the preferred embodiments. Modifications and alterations may occur to others upon reading and understanding the preceding detailed description. It is intended that the exemplary embodiment be construed as including all such modifications and alterations insofar as they come within the scope of the appended claims or the equivalents thereof.

The invention claimed is:

1. A non-transitory computer readable medium storing instructions executable by at least one electronic processor to perform a method for supporting remote experts (RE) in assisting local operators (LO) of respective medical imaging devices during medical imaging examinations, the method comprising:
   determining, in response to a calling local operator placing a call to a called remote expert, a context of the calling local operator based on at least one feed of a workspace of the calling local operator;
   retrieving, from a database, a view configuration for a determined user interface (UI) view based on the determined context; and
   controlling a display device to display the determined UI view based on the retrieved view configuration.

2. The non-transitory computer readable medium of claim 1, wherein the method further includes:
   determining the UI view based on the context; and
   retrieving the view configuration for the determined UI view.

3. The non-transitory computer readable medium of claim 2, wherein:
   the determining of a context of the calling local operator (LO) includes analyzing the at least one feed to determine a current location of the calling local operator; and
   the retrieving of the view configuration for the determined UI view is based at least in part on the current location of the calling local operator.

4. The non-transitory computer readable medium of claim 3, wherein:
   the retrieving of the view configuration for the determined UI view based at least in part on the current location of the calling local operator (LO) includes determining a UI view which presents a video feed acquired by a camera disposed at the current location of the calling local operator.

5. The non-transitory computer readable medium of claim 3, wherein:
   the retrieving of the view configuration for the determined UI view based at least in part on the current location of the calling local operator (LO) includes determining a UI view which presents an audio feed acquired by a microphone disposed at the current location of the calling local operator.

6. The non-transitory computer readable medium of claim 4, wherein:
   the analyzing of the audio feed or the video feed to determine a current location of the calling local operator (LO) is performed over the duration of the call to the called remote expert (RE) to continuously track the current location of the calling local operator.

7. The non-transitory computer readable medium of claim 6, wherein:
   the retrieving of the view configuration for the determined UI view is performed over the duration of the call to continuously update the UI view based at least in part on the continuously tracked location of the calling operator (LO);
   whereby the display device displays the determined UI view continuously updated in accord with the continuously tracked location of the calling operator.

8. The non-transitory computer readable medium of claim 1, wherein the retrieving the view configuration further includes:
   retrieving a view configuration of the determined UI view for the called remote expert (RE) from a plurality of UI views for different remote experts.

9. The non-transitory computer readable medium of claim 8, wherein the method further includes:
   providing a view configurations editor via which respective remote experts (RE) can configure respective remote expert-specific view configurations.

10. The non-transitory computer readable medium of claim 1, wherein the method further includes:
    routing, via a feeds router, the at least one feed to workstations of respective remote experts (RE) and to route calls from local operators to the workstations of the respective remote experts.

11. The non-transitory computer readable medium of claim 1, wherein the plurality of UI views includes at least:
    at least one workspace view which displays and/or outputs via a loudspeaker at least one audio/video feed routed by a feeds router;
    a site view which displays status information on a plurality of local operators (LO) at a common site; and
    an enterprise view which displays a map of geographic distribution of a plurality of sites.

12. A system for supporting remote experts (RE) in assisting local operators (LO) of respective medical imaging devices during medical imaging examinations, the system comprising:
    a feeds router configured to route audio/video feeds acquired by cameras and/or microphones disposed in workspaces of the respective local operators to workstations of respective remote experts and to route audio/video calls from local operators to the workstations of the respective remote experts;
a non-transitory data storage that stores view configurations for a plurality of user interface (UI) views; and
at least one electronic processor programmed to, in response to a calling local operator placing an audio/video call to a called remote expert via the feeds router:
    determine a context of the calling local operator based on at least the audio/video feeds acquired by the cameras and/or microphones disposed in the workspace of the calling local operator, wherein the context includes imaging procedure stage;
    based on the context, determine a UI view;
    retrieve the view configuration of the determined UI view from the non-transitory data storage; and
    cause the workstation of the called remote expert to display the determined UI view in accord with the retrieved view configuration.

13. The system of claim 12, wherein:
the determining of a context of the calling local operator (LO) includes analyzing the audio/video feeds acquired by the cameras and/or microphones disposed in the workspace of the calling local operator to determine a current location of the calling local operator; and
the determining of the UI view is based at least in part on the current location of the calling local operator.

14. The system of claim 13, wherein:
the determining of the UI view based at least in part on the current location of the calling local operator (LO) includes determining a UI view which presents an audio/video feed acquired by a camera disposed at the current location of the calling local operator.

15. The system of claim 13, wherein:
the analyzing of the audio/video feeds acquired by the cameras and/or microphones disposed in the workspace of the calling local operator (LO) to determine a current location of the calling local operator is performed over the duration of the audio/video call to the called remote expert (RE) to continuously track changes in the current location of the calling local operator; and
the determining of the UI view is performed over the duration of the audio/video call to continuously update the UI view based at least in part on the continuously tracked changes in location of the calling local operator;
whereby the workstation of the called remote expert is caused to display the determined UI view continuously updated in accord with the continuously tracked changes in location of the calling local operator.

16. The system of claim 12, wherein:
the non-transitory data storage stores different view configurations for the plurality of UI views for different remote experts (RE); and
the retrieving of the view configuration includes retrieving the view configuration of the determined UI view for the called remote expert.

17. The system of claim 16, wherein the at least one electronic processor is further programmed to:
provide a view configurations editor via which respective remote experts (RE) can configure respective remote expert-specific view configurations.

18. The system of claim 12, wherein plurality of UI views includes at least:
at least one workspace view which displays and/or outputs via a loudspeaker at least one audio/video feed routed by the feeds router; and
a site view which displays status information on a plurality of local operators (LO) at a common site.

19. The system of claim 18, wherein plurality of UI views further includes an enterprise view which displays a map of geographic distribution of a plurality of sites.

20. A method for supporting remote experts (RE) in assisting local operators (LO) of respective medical imaging devices in performing medical imaging examinations, the method comprising:
    determining a context of the local operator performing the medical imaging examination based on at least one feed of a workspace of the calling local operator;
    based on the context, determining a user interface (UI) view;
    retrieving a view configuration of the determined UI view for the remote expert from a non-transitory data storage; and
    causing a workstation of the called remote expert to display the determined UI view in accord with the retrieved view configuration.

21. The method of claim 20, wherein:
the determining of a context of the calling local operator (LO) includes analyzing the audio/video feeds acquired by the cameras and/or microphones disposed in the workspace of the calling local operator to determine a current location of the calling local operator,
the analyzing of the audio/video feeds acquired by the cameras and/or microphones disposed in the workspace of the calling local operator (LO) to determine a current location of the calling local operator is performed over the duration of the audio/video call to the called remote expert (RE) to continuously track changes in the current location of the calling local operator; and
the determining of the UI view is performed over the duration of the audio/video call to continuously update the UI view based at least in part on the continuously tracked changes in location of the calling local operator;
whereby the workstation of the called remote expert is caused to display the determined UI view continuously updated in accord with the continuously tracked changes in location of the calling local operator.

22. The method of claim 20, wherein the workspace of the calling local operator includes a medical imaging device controller and the audio/video feed is used to analyze noises occurring within the workspace of the calling local operator.

* * * * *